United States Patent [19]
Reid et al.

[11] Patent Number: 5,405,228
[45] Date of Patent: Apr. 11, 1995

[54] NUT CAGE AND MOUNT

[75] Inventors: Leonard F. Reid, Bellevue; Eric T. Easterbrook, Kent; Roger T. Bolstad, Seattle; Charles M. Copple, Kent; Darryl E. Quincey, Seattle; Michael A. Landy; Louis A. Champoux, both of Bellevue, all of Wash.

[73] Assignee: Fatigue Technology, Inc., Seattle, Wash.

[21] Appl. No.: 32,340

[22] Filed: Mar. 16, 1993

Related U.S. Application Data

[60] Continuation-in-part of Ser. No. 755,167, Sep. 5, 1991, Pat. No. 5,245,743, which is a division of Ser. No. 558,900, Jul. 26, 1990, Pat. No. 5,096,349.

[51] Int. Cl.$^6$ .................. F16B 37/04; F16B 39/28
[52] U.S. Cl. ................................ 411/183; 411/113; 411/432
[58] Field of Search ........ 411/103, 105, 108, 111–113, 411/177, 183, 432

[56] References Cited

U.S. PATENT DOCUMENTS

| | | |
|---|---|---|
| 2,078,411 | 4/1937 | Richardson . |
| 2,421,201 | 5/1947 | Hallock . |
| 2,986,188 | 5/1961 | Karp et al. . |
| 3,126,039 | 3/1964 | Fiddler . |
| 3,305,987 | 2/1967 | Weaver ............................ 52/283 |
| 3,316,953 | 5/1967 | Fransson et al. . |
| 3,765,078 | 10/1973 | Gulistan ........................ 411/183 X |
| 4,186,787 | 2/1980 | Husain ........................... 411/183 |
| 4,295,766 | 10/1981 | Shaw ............................. 411/113 |
| 4,768,907 | 9/1988 | Gauron .......................... 411/85 |
| 4,830,557 | 5/1989 | Harris et al. ................... 411/113 |
| 5,096,349 | 3/1992 | Landy et al. ................... 411/183 X |

FOREIGN PATENT DOCUMENTS 482929 12/1969 Switzerland .
495976 11/1938 United Kingdom .

Primary Examiner—Neill R. Wilson
Attorney, Agent, or Firm—Delbert J. Barnard

[57] ABSTRACT

A circular opening (54) is formed in a wall (12). A tubular shank (42) of a nut mounting unit (40) is inserted into the opening (54). The unit (40) is moved endwise to place a nut cage base (46) against the wall (12). A split sleeve (82) is installed on a small diameter portion (90) of a mandrel (M). The mandrel (M) and sleeve (82) are inserted into the tubular shank (42) from the side of the wall (12) opposite the nut cage (44). The mandrel (M) is then retracted to successfully move increasing and maximum diameter portions (90, 92) of the mandrel (M) through the split sleeve (82). The mandrel portions (92, 94) exert a radially outwardly expanding force on the split sleeve (82). The split sleeve (82) in turn imposes a radially outwardly expanding force on the tubular shank (42). This causes a plastic deformation of the tubular shank (42), creating a tight interference fit between the tubular shake (42) and the sidewall of the opening (54). In this manner, the unit (40) is firmly secured to the wall (12). Next, a nut (20) is inserted into the nut cage (44), between end stops (56, 58). A retainer spring (68) is placed over the base (24) of the nut (20), and is compressed an amount sufficient to move side portions (64, 66) together enough that they will fit between cage sidewalls (48, 50). Then, the squeezing force on the retainer spring (68) is released, allowing side portions (64, 66) to move outwardly into openings (60, 62) in the sidewalls (48, 50). In this position the sidewalls (48, 50) restrain sideways movement of the nut. The end stops (56, 58) restrain endwise movement of the nut (20). The inner spring (68) prevents movement of the nut (20) out from the nut cage (44).

8 Claims, 8 Drawing Sheets

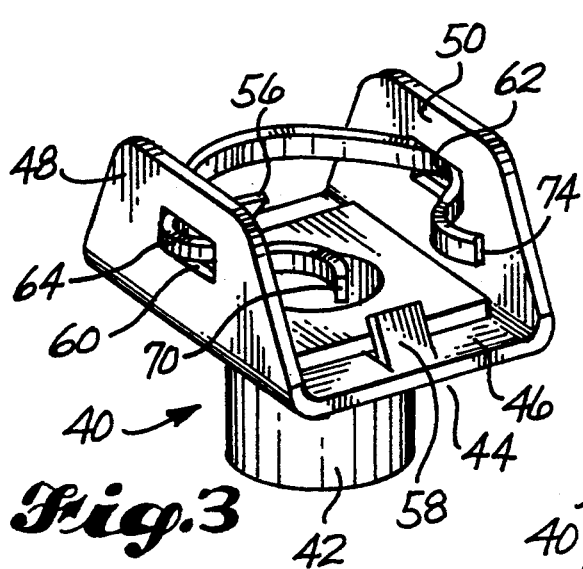
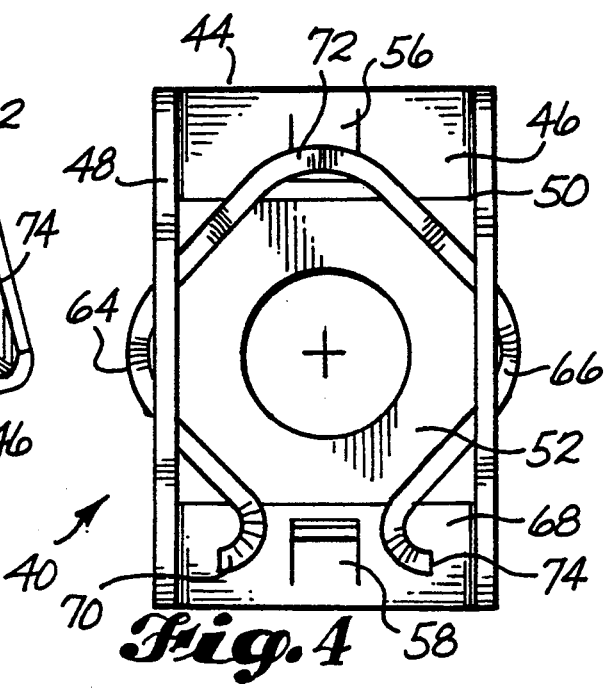
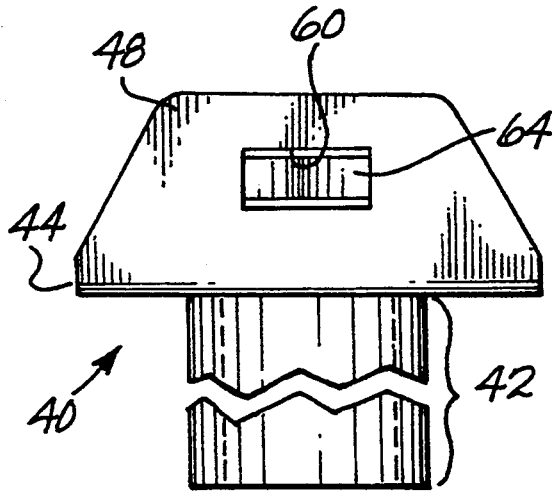
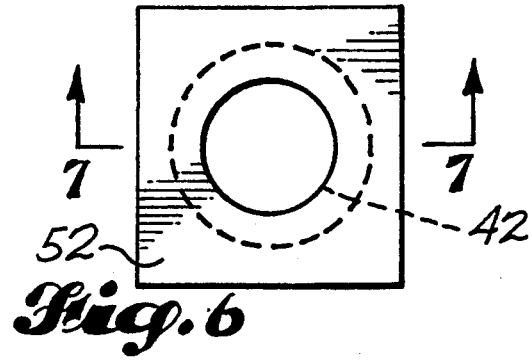
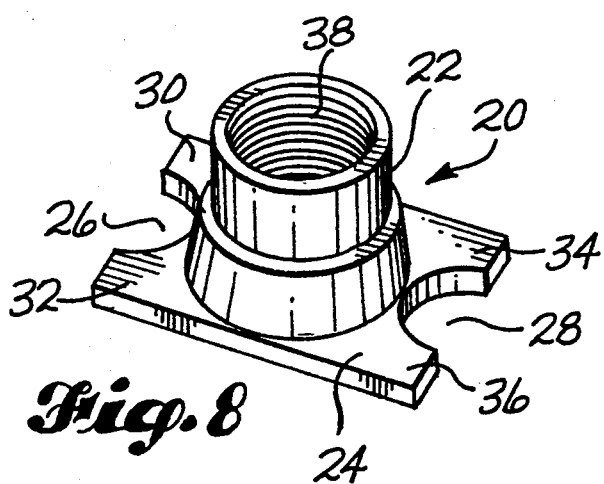
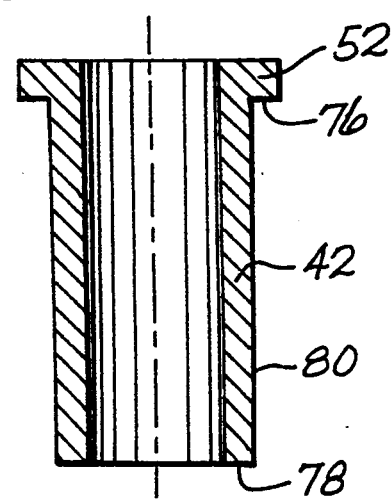

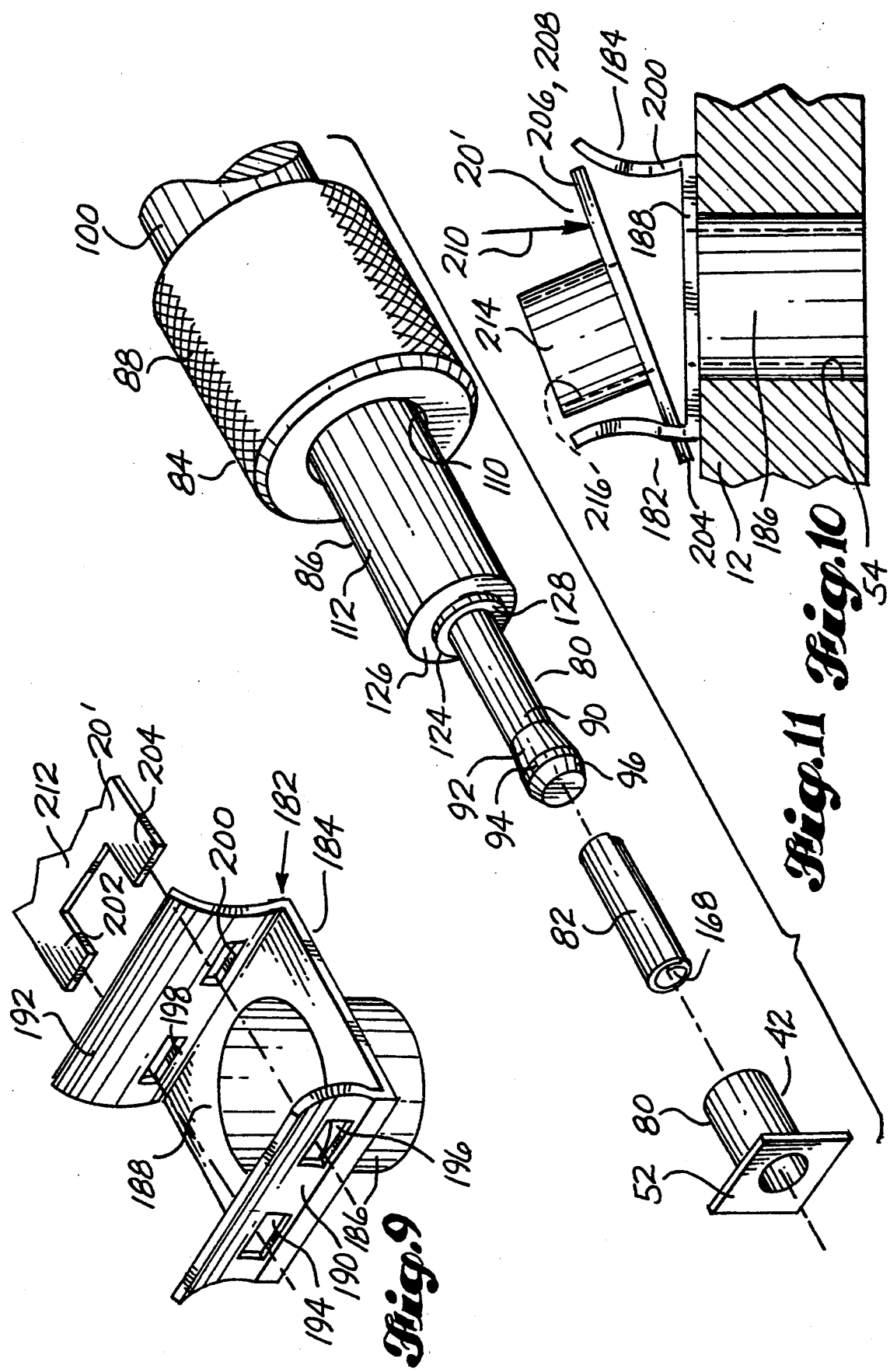

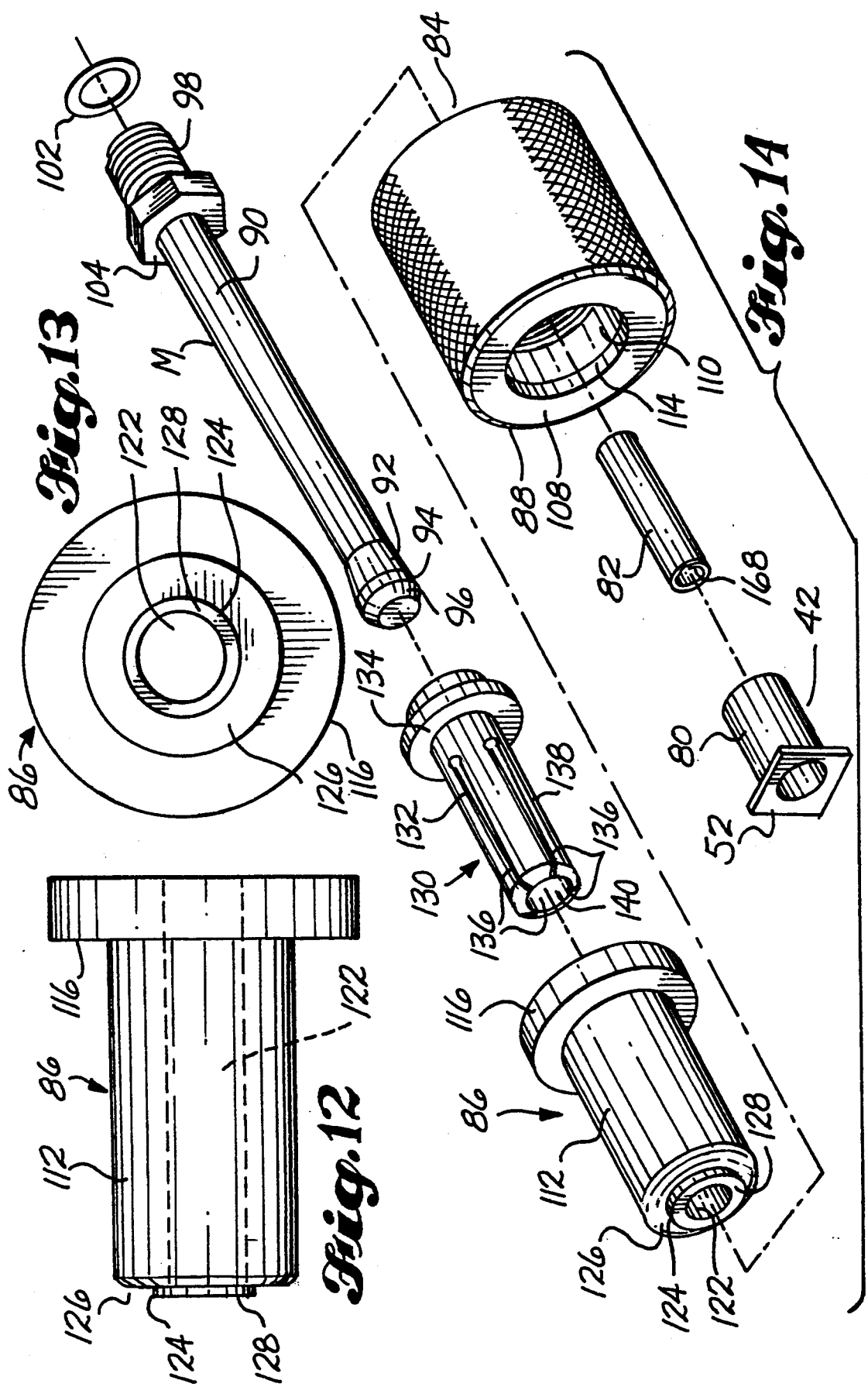

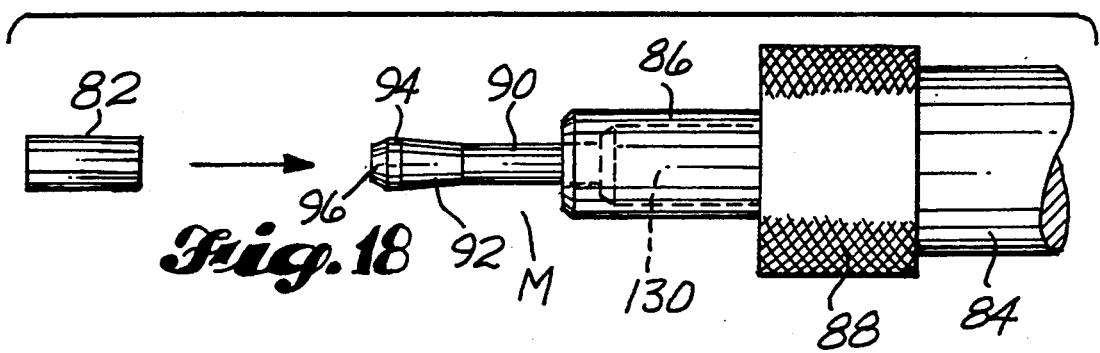
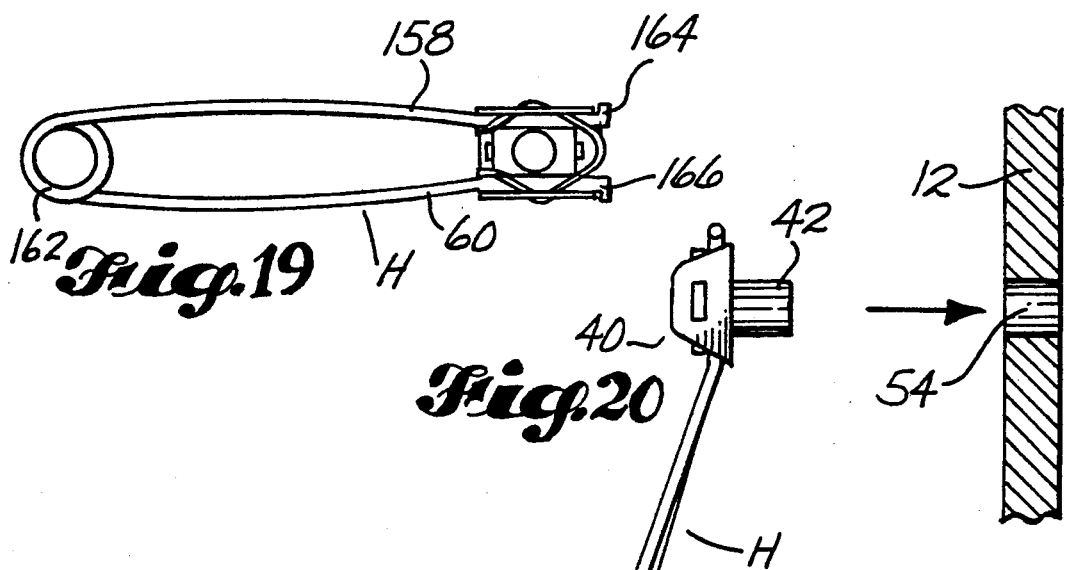
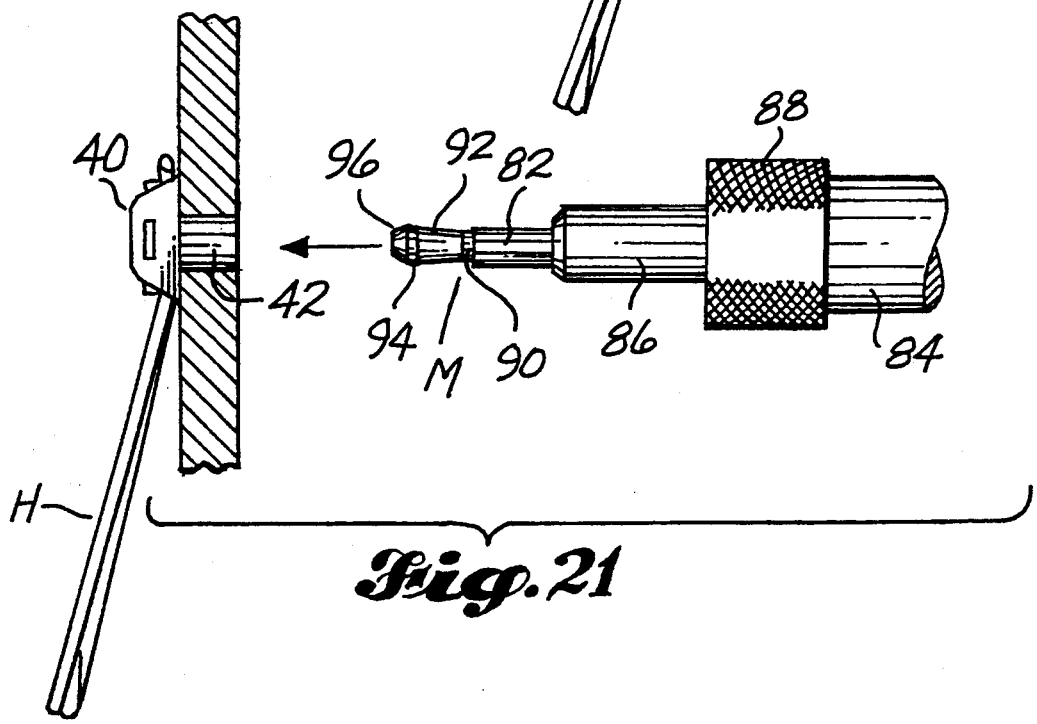

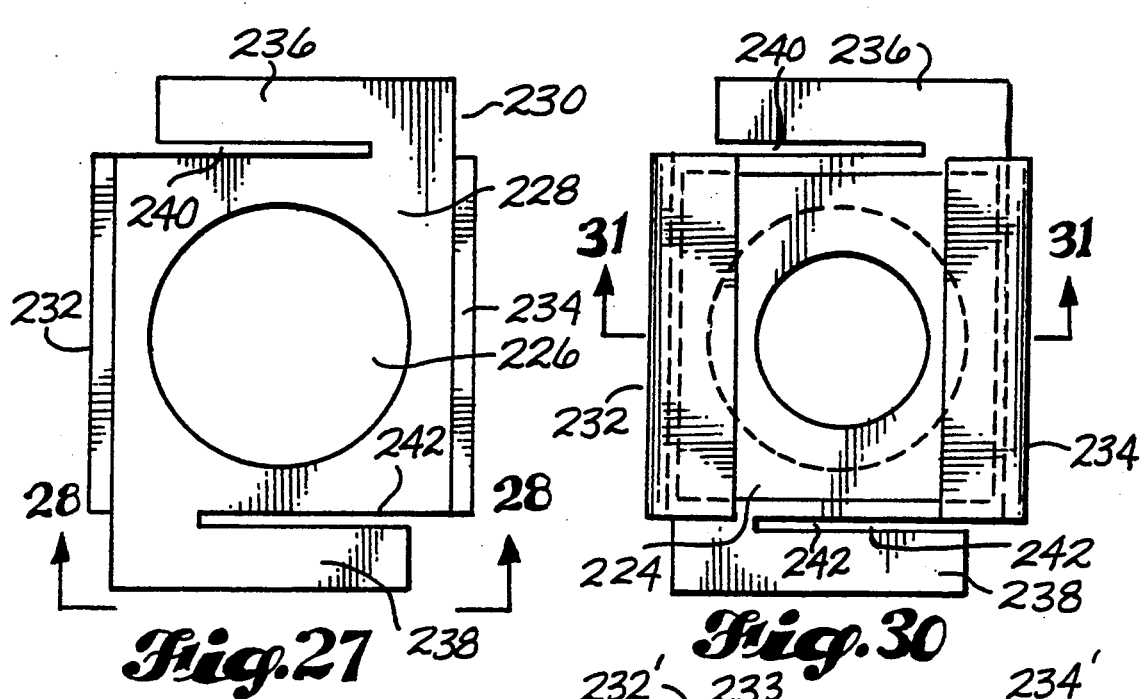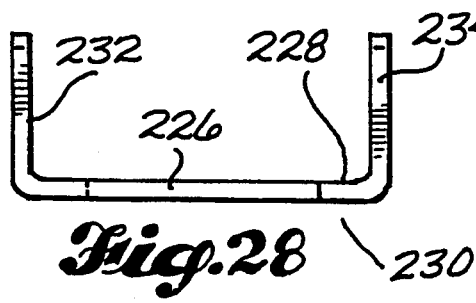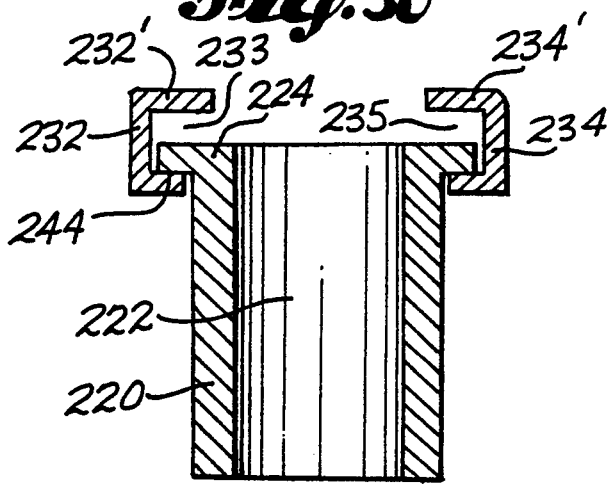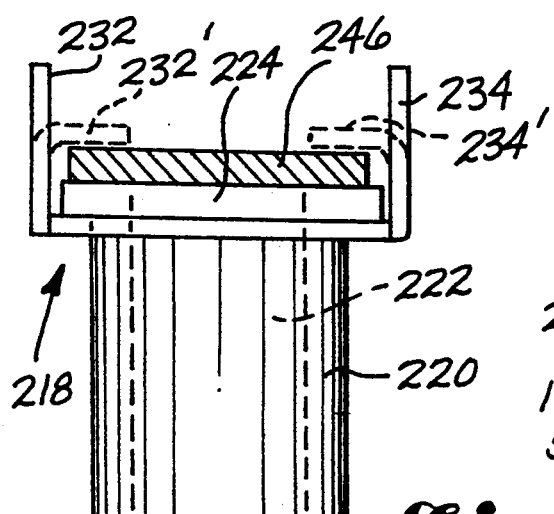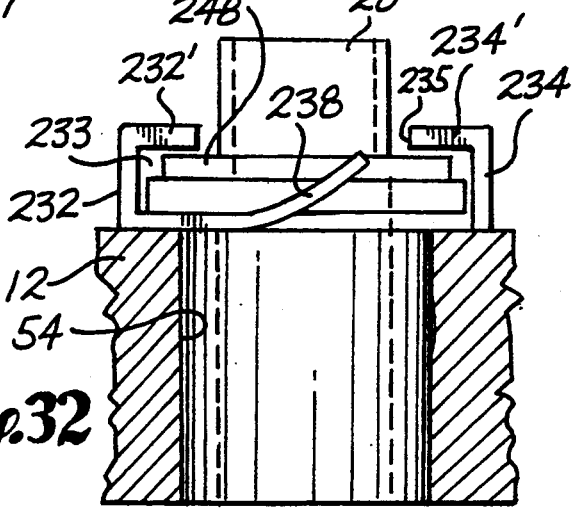

NUT CAGE AND MOUNT

RELATED APPLICATION

This is a continuation-in-part of U.S. Ser. No. 755,167, filed Sep. 5, 1991, and now U.S. Pat. No 5,245,743, which in turn is a division of U.S. Ser. No. 558,900, filed Jul. 26, 1990, and now U.S. Pat. No. 5,096,349.

TECHNICAL FIELD

The present invention relates to a nut cage mount that utilizes a single hole in a member to which a fastener nut is to be secured. The nut cage mount of the present invention is a replacement for a nut plate.

BACKGROUND ART

A nut plate is a small plate to which a fastener nut is secured. It is used in aircraft on walls which do not permit the use of a threaded opening. The nut plate typically includes a pair of fastener openings spaced apart from each other at opposite ends of the nut plate. Fastener openings are drilled in a wall to which the nut plate is secured. The nut plate is positioned on the wall with its fastener openings in alignment with the fastener openings in the wall. Then rivets or other suitable fasteners are inserted through the aligned openings and used to secure the nut plate to the wall. A problem with this type of system is that there is wear at the rivets and fatigue in the wall where the rivets extend.

The nut carried by the nut plate includes a threaded opening for receiving a threaded end portion of a bolt. It is necessary that the wall include an opening for the bolt as the bolt is installed from the side of the wall opposite the nut. Accordingly, when a nut plate is used, it is necessary to form at least three openings in the wall for each nut, one to serve as a passageway for the bolt and at least two others to serve as fastener openings to receive fasteners that are used to secure the nut plate to the wall.

A principal object of the present invention is to provide a substitute for the nutplate which requires the formation of a single opening in the wall. Other nut plate substitutes are known, such as a flair nut and nuts on a carrier having a tubular mounting portion which is intended to friction fit within a single opening. A problem with such fasteners is that they rotate in the opening and do not stay in place and/or the opening provides a fatigue problem area.

Prior art nut retainers are disclosed by U.S. Pat. Nos. 2,078,411, granted Apr. 27, 1937 to Frederick G. Richardson, 2,421,201, granted May 27, 1947 to Robert L. Hallock, 2,986,188, granted May 30, 1961 to Joseph A. Karp and M. P. Haas, 3,126,039, granted Mar. 24, 1964 to Theodore E. Fiddler, 3,305,987, granted Feb. 28, 1967 to Floyd E. Weaver, 3,316,953, granted May 2, 1967 to Karl E. Fransson and Anders Larsson, 4,295,766, granted Oct. 20, 1981 to Francis Shaw, 4,768,907, granted Sep. 6, 1988 to Richard F. Gauron, 4,830,557, granted May 16, 1989 to David J. Harris and Richard L. Elgin, by British Patent No. 495,976, granted November 1938 to Swanstron, and by Swiss Patent No. 482,929, granted Dec. 15, 1969 to Josef Bucheli.

DISCLOSURE OF THE INVENTION

The nut plate substitute, provided by the present invention, is what may be referred to as a nut mount or nut mounting unit. Such mount or unit is firmly connectable to a wall by use of a single circular opening in the wall.

According to one aspect of the invention, a nut mounting unit is provided which includes a tubular shank having an outside diameter sized for close fit insertion into a circular opening in a wall, and a substantially uniform inside diameter. A flange is formed integral with the tubular shank of one end of the tubular shank. The flange is larger than the circular opening in the wall. A radial shoulder is formed in the flange where the tubular shank joins the flange. A nut cage is provided which includes a base and an opening in the base sized to receive the tubular shank. The tubular shank is inserted through the opening and moved to place its flange against the base of the nut cage. The tubular shank includes a passageway for receiving expansion tooling. The tubular shank is expanded radially by use of the expansion tooling. The tubular shank is constructed from a material that in response to radial expansion on it will become permanently larger in diameter. This will make a tight interference fit between the wall opening to in that manner secure the unit to the wall. The nut cage includes a nut cage base and a pair of opposite sidewalls which project from the base in a direction opposite from the tubular shank. The sidewalls define between them a space for receiving a removable nut. The nut includes a base which is received in the nut cage between the sidewalls of the nut cage. The nut cage also includes means for retaining the nut in place while permitting a limited amount of movement or "float" of the nut while it is in the nut cage, and permitting removal of the nut from the nut cage.

According to one aspect of the invention, the opposite sidewalls of the nut cage include a pair of opposed openings, and the nut cage base includes a pair of spaced apart stops. The stops and the sidewalls together form a space in which the base portion of a floating nut is received. The means for securing the nut comprises a removable retainer spring that fits over the base of the nut and includes side portions which project into the side openings in the sidewalls.

In another embodiment, the sidewalls of the nut cage include convex inner surfaces. The means for securing a nut comprises at least one opening in each sidewall. Each opening receives a lug on the base of the nut. One lug on the base of the nut is inserted into the opening in one sidewall. The other lug is positioned against the convex inner surface of the other sidewall. Then, the nut is pushed towards the base of the nut cage, so that the other lug will slide along the convex surface and pop into the second opening. The base of the nut may include two spaced apart lugs on each of its sides and the sidewalls of the nut cage may each include two lug receiving openings.

According to another aspect of the invention, the opposite sidewalls of the nut cage may include edge portions which are turned inwardly to overhang the flange on the tubular shank and define side channels for receiving side edge portions of a nut base. The nut is installed by sliding it endwise into the side channels. The means for securing the nut within the nut cage includes a bent up member at each end of the nut cage, in a position to prevent sliding movement of the nut out from the nut cage. One of these members is positioned substantially flat with the nut cage base when the nut is being slid into the nut cage. It is then bent upwardly to provide an end stop for the nut.

Another aspect of the invention is to provide a method of installing a nut cage unit by use of split sleeve expansion tooling. According to this method, a nut cage is provided which includes a base and sidewalls turned upwardly from the base. A tubular shank of a retainer is inserted through the opening until a flange at the end of the tubular shank is against the base of the nut plate. Then, this assembly is moved to place the tubular shank into an opening in a wall and the nut cage against the wall. Next, a split sleeve is installed onto a small diameter portion of an extended mandrel that is attached to the mandrel puller. The mandrel puller is moved to insert the mandrel and sleeve through the central opening in the tubular shank, from the end of the tubular shank opposite the nut cage. Then, the mandrel is pulled through the sleeve and the tubular shank to move increasing and maximum diameter portions of the mandrel through the sleeve and the tubular shank. As they move, these mandrel parts increase the diameters of the sleeve and the tubular shank. This radial expansion of the tubular shank does two things. Firstly, it introduces fatigue life enhancing compressing residual stresses in the wall material immediately surrounding the tubular shank. Secondly, it creates a tight interference fit between the tubular shank and the sidewall of the opening. This type interference fit secures the tubular shank and the nut cage to the wall.

Next, a floating nut is placed within the nut cage. The floating nut is then removably secured within the nut cage.

Other objects, features and advantages of the invention are hereinafter described in some detail, as a part of the description of the best mode and the alternative embodiments of the invention.

BRIEF DESCRIPTION OF THE DRAWINGS

In the drawing, like reference numerals are used to designate like parts throughout the several views, and:

FIG. 3 is a pictorial view taken from above and looking towards one side and one end of a nut mounting unit incorporating an aspect of the invention;

FIG. 4 is a top plan view of the unit shown by FIG. 3;

FIG. 5 is a side elevational view of the unit shown by FIG. 3;

FIG. 6 is a top plan view of a tubular retainer used in practice of the invention;

FIG. 7 is a longitudinal sectional view taken substantially along line 7—7 of FIG. 6;

FIG. 8 is a pictorial view of a fragment of a nut spaced from floating anchor nut;

FIG. 9 is a pictorial view of a second embodiment of nut cage;

FIG. 10 is an elevational view of a retainer and the nut cage shown by FIG. 9, such view showing a floating anchor nut in the process of being installed in the nut cage;

FIG. 11 is a fragmentary pictorial view taken from above and to one side of the nosepiece end of a puller tool, showing a mandrel in an extended position, and showing a split sleeve and a tubular retainer spaced axially from the mandrel;

FIG. 12 is a side elevational view of the nosepiece shown in FIG. 11;

FIG. 13 is an outer end elevational view of the nosepiece shown by FIG. 12;

FIG. 14 is an exploded pictorial view of the assembly shown by FIG. 11;

FIG. 18 is a fragmentary stride elevational view, showing a mandrel extended and a split sleeve being moved towards the mandrel, for insertion on the small diameter portion of the mandrel;

FIG. 19 is a plan view of a tubular retainer and a nut cage assembled on a holder;

FIG. 20 is a side elevational view of the assembly shown in FIG. 19, positioned to align the tubular body of the tubular retainer with an opening in a workpiece;

FIG. 21 shows the tubular body of the tubular retainer moved into the opening in the workpiece, and shows the assembled components of FIG. 18 being moved towards the tubular retainer;

FIG. 27 is a top plan view of a partially manufactured third embodiment of nut cage;

FIG. 28 is an end view of the nut cage shown in FIG. 27, taken substantially from the position shown by line 28—28 in FIG. 27.

FIG. 29 is an elevational view showing a flange tubular member inserted in the nut cage shown by FIGS. 27 and 28, and showing an anvil in section, and positioned on the flange, and further including solid line showings of side members in a position in which they are parallel to each other and perpendicular to the base of the nut cage, and broken line showings of the outer parts of the side portions bent over the anvil;

FIG. 30 is a top plan view of the nut cage—tubular member assembly, with the outer parts of the side members bent over the flange of the tubular member;

FIG. 31 is a longitudinal sectional view taken substantially along line 31—31 of FIG. 30; and FIG. 32 is an elevational view of the completed assembly, shown installed in an opening in a receiving member.

BEST MODE FOR CARRYING OUT THE INVENTION

Figure 1:
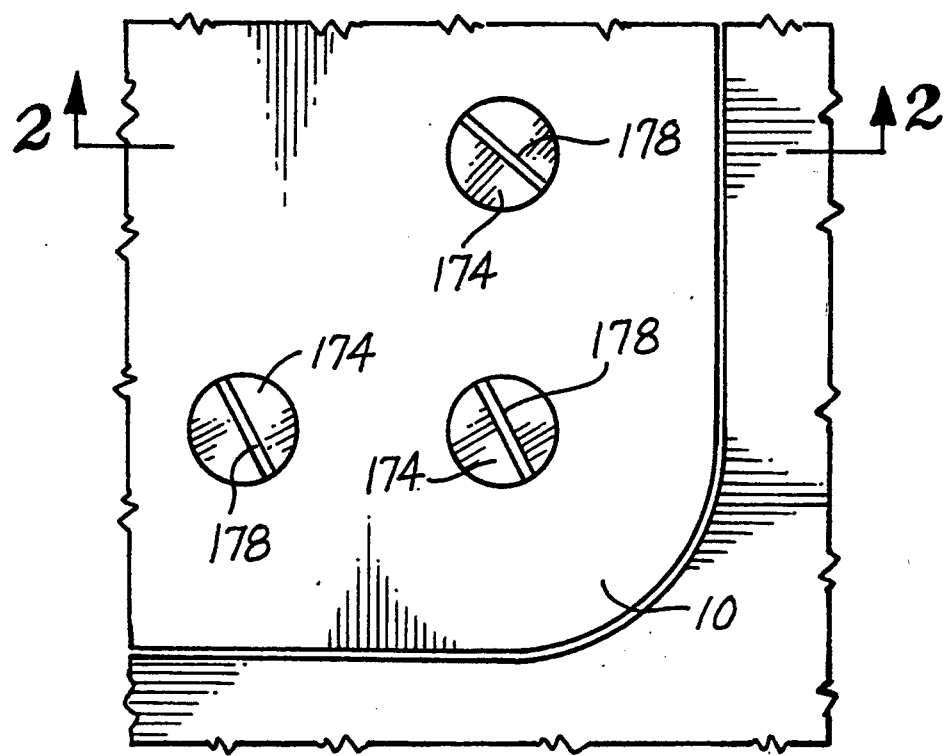
FIG. 1 is a fragmentary plan view of a corner portion of an inspection plate or the like which is secured in place by use of a plurality of fastener bolts.
Figure 2:
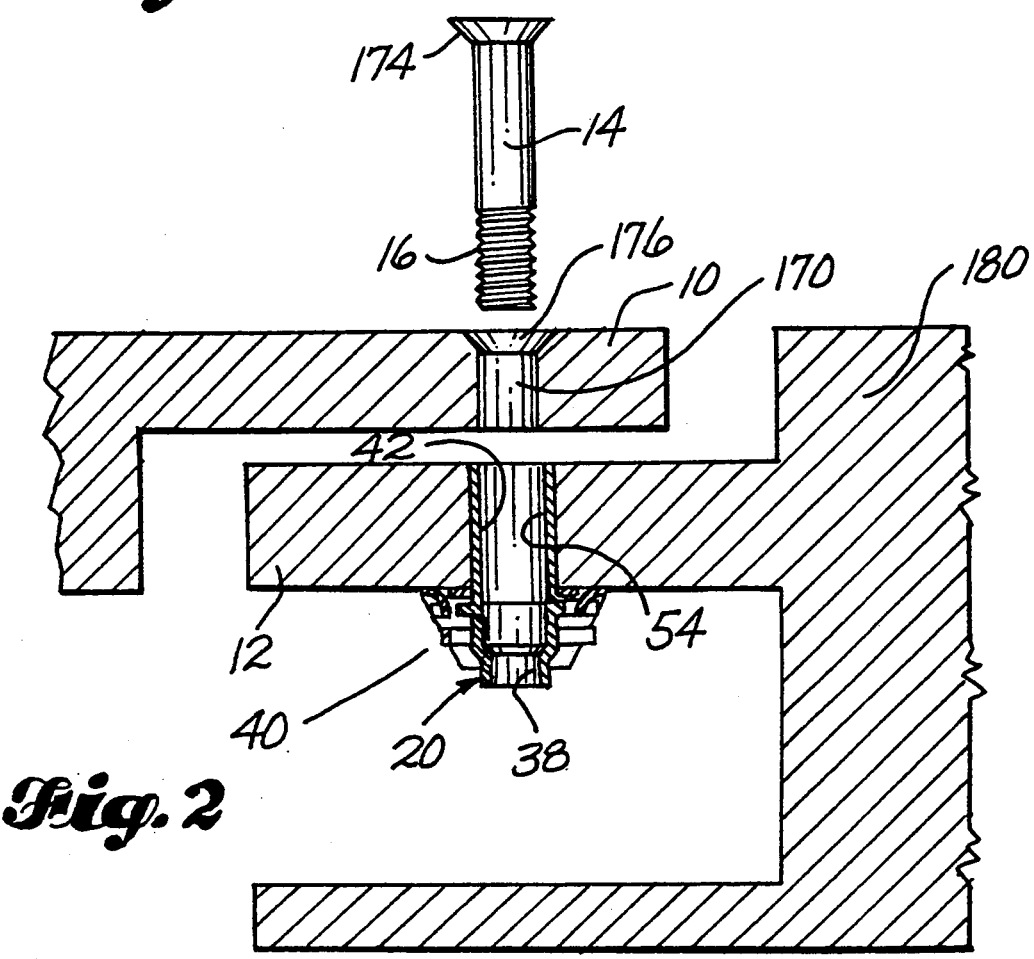
FIG. 2 is a fragmentary sectional view taken substantially along line 2—2 of FIG. 1, with some parts shown exploded apart, and other parts shown assembled.

Referring to FIGS. 1 and 2, member 10 is an example first member which needs to be removably secured to an example second member 12. By way of typical and therefore nonlimitive example, member 10 may be an inspection plate and member 12 may be a flange which borders an opening that is normally covered by the inspection plate 10. The inspection plate 10 is secured to the flange 12 by means of a plurality of bolts 14 which include threaded end portions 16. The threaded portions 16 of each bolt 14 screws into a threaded opening 18 in a nut 20 (FIG. 8, for example). Nut 20 includes a tubular portion 22 and a base portion 24. Base portion 24 includes end recesses 26, 28 and axially projecting end portions 30, 32 and 34, 36 situated on opposite sides of the recesses 26, 28, respectively. The interior of tubular portion is threaded at 38.

In accordance with the invention, the nut 20 is held in place by a nut mounting unit 40 (FIGS. 3-5). Unit 40 comprises a tubular shank 42 and a nut cage 44. Nut cage 44 may include a base 46 and a pair of opposite sidewalls 48, 50 which extend perpendicular from the base 46. Base 46 includes a circular center opening sized to receive and pass the outside diameter of shank 42. As shown by FIGS. 3, 4, 6 and 7, a radial flange 52 is formed integral with shank 42 at one end of shank 42. Flange 52 is preferably square in plan form (FIGS. 4 and 6). Each side of flange 52 is of a length slightly less than the lateral distance between the inside surfaces of walls 48, 50. Tubular shank 42 is inserted through the central opening in base 46 and the flange 52 is moved into contact with the base 46, prior to insertion of tubular shank 40 into an opening 54 (FIG. 2) in member 12. In preferred form, base 46 includes a bent up lug 56, 58 at each end of cage 44, endwise outwardly of flange 52. As shown, each lug 56, 58 is formed by cutting three sides of a square in the base material, leaving the fourth side connected, and then bending up the lug that is formed by the cuts. As will hereinafter be described, lugs 56, 58 form end restraints for the nut 20. In preferred form, the sidewalls 48, 50 include sidewall openings 60, 62 which receive diametrically opposite portions 64, 66 of a nut retainer 68. As best shown by FIG. 4, nut retainer 68 may be a spring formed from rectangular wire bent into the form illustrated. Spring 68 is one piece and extends from end portion 70 to side portion 64, then to end portion 72, and then to side portion 66, and then to end portion 74. End portions 70, 74 are squeezed together for moving side portions 64, 66 out from opening 60, 62. It is in this manner that the spring 64 is removed from the cage 44. Spring 68 is installed by first squeezing end portions 70, 74 together until side portions 64, 66 are close enough together to fit in the space between the sidewalls 48, 50 of cage 44. Then, the spring 68 is placed inside the cage 44, with side portions 64, 66 aligned with openings 60, 62. Then, the squeeze force on end portions 70, 74 is released, allowing the side portions 64, 66 to move outwardly and into the openings 60, 62, into the position shown by FIG. 4.

Referring to FIG. 7, flange 52 makes a right angle shoulder 76 with tubular portion 42. This shoulder 76 fits down onto base 46 when shank portion 42 is inserted through the central opening in the base 46. Tubular shank 42 is sized to snugly fit within the opening 54 in wall 12. Tubular shank 42 may have a length measuring from shoulder 76 to end surface 78 which is substantially equal to the thickness of wall 12. Or, tubular shank 42 may be slightly shorter or slightly longer than the thickness of wall 12. Member 42, 52 may be constructed from stainless steel, for example 17-4PH stainless steel, per ANS 5643. The outer surface 80 of tubular shank 42 may be treated so as to increase its coefficient of friction. It may be machined or otherwise treated to provide projections which can interlock with the sidewall surface of the opening 54, as described in the aforementioned U.S. Pat. No. 5,096,349.

In preferred form, the nut mounting unit 40 is installed by use of a split sleeve expansion method. The tools for performance of this method include a mandrel 80, a split sleeve 82 and a mandrel puller 84. Mandrel puller 84 may be a puller gun of the type that is disclosed in U.S. Pat. No. 4,187,708, granted Feb. 12, 1980, to Louis A. Champoux. The mandrel M, sleeve 82 and nosecap assembly 86, 88 are essentially like the mandrel, split sleeve and nosepiece assembly disclosed in the aforementioned U.S. Pat. Nos. 5,096,349 and 5,103,548. For this reason, these tools will not be described in detail herein. Rather, the disclosures of U.S. Pat. Nos. 4,187,708, 5,096,349 and 5,103,548 are incorporated herein by reference.

Mandrel M includes, in series, a small diameter portion 90, and increasing diameter portion 92, a maximum diameter portion 94 and a tapered end portion 96. Mandrel M has a threaded inner end portion 98 that is secured to a piston 100 (FIG. 11) located inside of the puller. An O-ring 102 may be positioned between a flange 104 on mandrel M and the front end of the piston 100. Mandrel puller 84 includes an elongated nosepiece 106 that is secured to the front end of the mandrel puller 84 by means of a nose cap 108. Nose cap 108 includes an end opening 110 through which an elongated tubular nose portion 112 of the nosepiece 106 extends. Opening 110 is surrounded by an annular flange 114. The nosepiece 106 includes an annular base 116 which is located within a chamber 118 (FIG. 15) in nosecap 108, with its radial surface 120 against the radial inner surface of the flange 114. Tubular portion or body 112 projects forwardly from the annular base 116. As shown by FIGS. 12-17, the body 112 is a one piece tubular member including a sidewall of substantial thickness. Nose portion 112 includes a central passageway 122. The outer end of nosepiece 106 includes a central annular projection 124 which immediately surrounds the central passageway 122, in its extent at the outer end of the nosepiece 106. An annular end surface 126 immediately surrounds projection 124. Projection 124 has an annular end surface 128 that is parallel to but spaced forwardly from annular surface 126.

A sleeve retainer 130 is positioned within the nosepiece 106. Sleeve retainer 130 includes an axially split tubular portion 132 which extends into passageway 112 (e.g. FIG. 15). An annular flange 134 is connected to the inner end of sleeve retainer 130. Longitudinal slits 136 (e.g. 4) divide tubular member 132 into a like number of longitudinal segments or fingers 138. Sleeve retainer 130 includes a central passageway 140.

Figure 15:
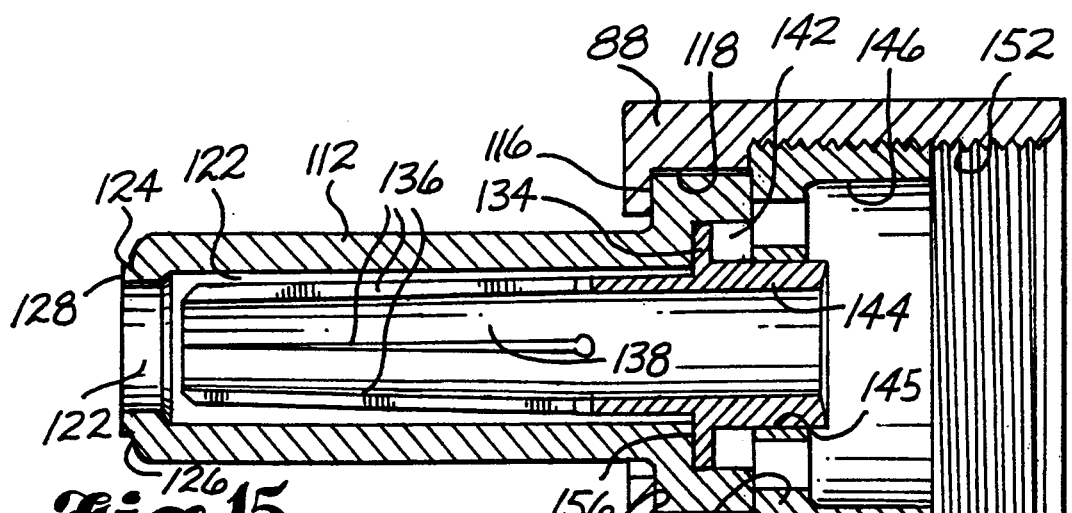
FIG. 15 is a longitudinal sectional view taken through a preferred embodiment of the nosepiece, a sleeve retainer within the nosepiece, a nosecap and an internal nut for securing the nosepiece and sleeve retainer within the nosecap.

As shown in FIG. 15, flange 134 fits within a chamber 142 formed in flange 116. The inner end portion 144 of sleeve retainer 130 extends through a central opening 144 in a nut 146. Nut 146 includes a forward wall 148 which forms the rear closure for floor chamber 142. Nut 146 has external threads 150 which mate with internal threads 152 in nose cap 108. As best shown in FIG. 15, the sleeve retainer 130 and the nosepiece 106 are assembled and are inserted into the nose cap 108, through the rear opening in the nose cap 108. Then, the nut 146 is inserted through the same rear opening and rotated until the radial wall 148 meets radial surface 154. For reasons that will be hereinafter explained, sleeve retainer 130 is movable axially within nosepiece 106 between contact of flange 134 with the forward end surface 156 of cavity 142 and the rearward closure 148 for cavity 142.

Figure 24:
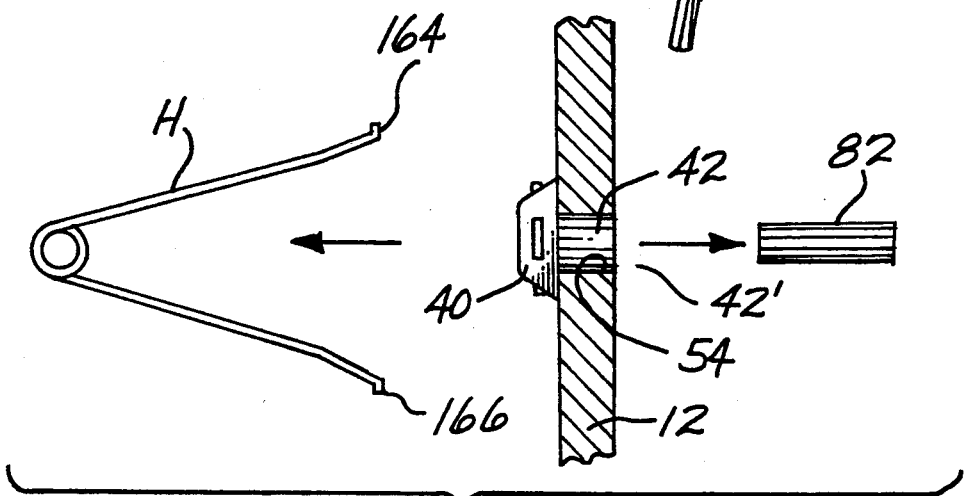
FIG. 24 is a view like FIGS. 21-23, following the pulling of the mandrel through the split sleeve and tubular body of the tubular retainer, such view showing the split sleeve being removed from the tubular body on one side of the workpiece and the holder being removed from the nut cage and tubular retainer assembly from the opposite side of the workpiece.

A method of the invention will now be described with primary reference to FIGS. 18–26. A drill bit (not shown) installed in a power drill (not shown) is used to drill the opening 54 in member 12. Next, the tubular shank 42 of an anchor member 42, 52 is inserted through an opening in the base wall 68 of nut cage 44. The insertion is from the side of cage 44 which includes the sidewalls 48, 50. The flange 52 is moved downwardly until the shoulder 76 is against the surface of base 46 immediately surrounding the base opening. The unit 40 may be handled by means of a handle H. As shown in FIGS. 19–21, 23 and 24, the handle H is formed from wire and is in the nature of a spring. It includes a pair of side members 158, 160 which extend from a coil 162. The static position of handle H is shown in FIG. 24. Side parts 158, 160 may include lugs 164, 166 at their ends. The side parts 158, 160 are squeezed together and are then set down into the channel portion of the nut cage 44, on top of flange 52. Then, the retainer spring 68 is installed (FIG. 19) to secure the unit 40 to the handle H. Then, the handle H is manipulated so as to insert the tubular shank 42 into the opening 54 (FIG. 20). The unit 44 is moved in this manner until the under surface of nut cage base 56 is against the member 12 (FIG. 21).

A split sleeve 82 is installed onto the end of mandrel M while mandrel M is in an extended position. The split sleeve 82 is moved endwise to place it on the small diameter portion 90 of mandrel M (FIG. 21). Split sleeve 82 includes a central opening 168 through which the mandrel M extends.

Figure 16:
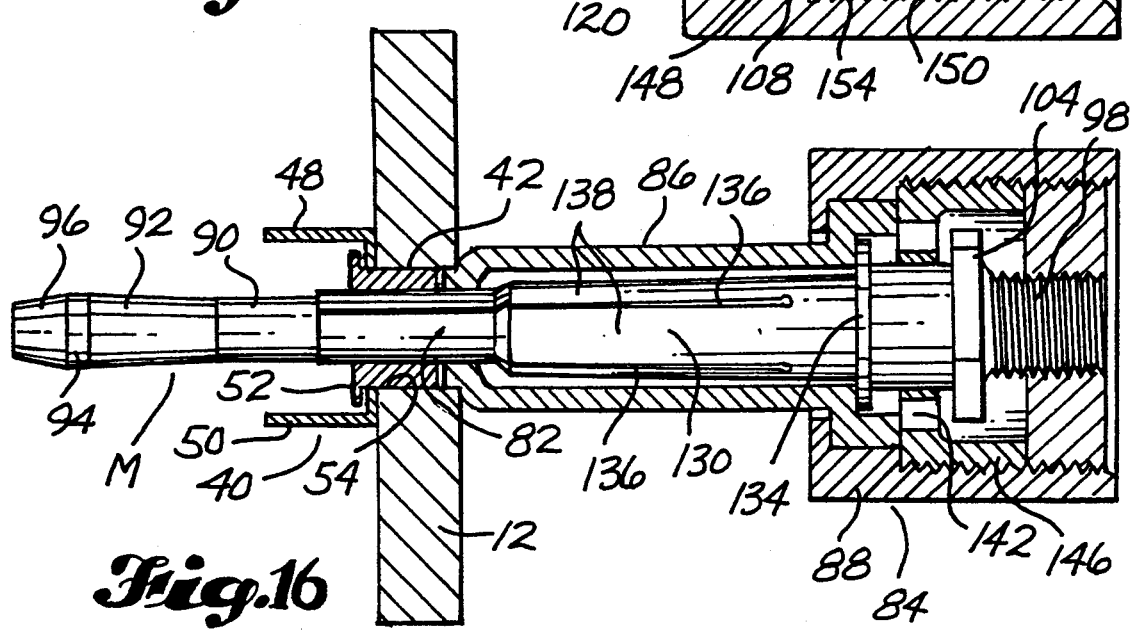
FIG. 16 is a view partially in longitudinal section and partially in supplied elevation, showing a mandrel, a split sleeve and a tubular retainer assembled in an opening in a workpiece.
Figure 17:
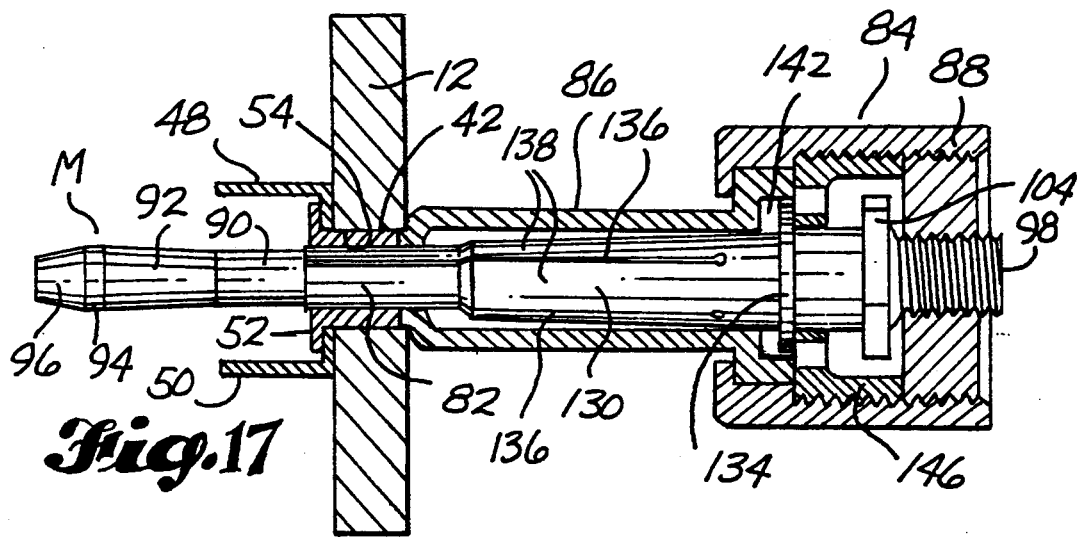
FIG. 17 is a view like FIG. 16, but showing the position of the parts following an initial pull on the mandrel, for first positioning the tubular retainer within the opening in the workpiece.
Figure 22:
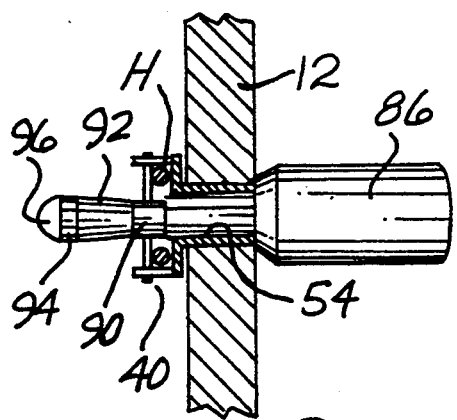
FIG. 22 is a view like FIG. 21, but showing the mandrel and split sleeve within the tubular body of the tubular retainer, and the nosepiece of the puller against the workpiece.
Figure 23:
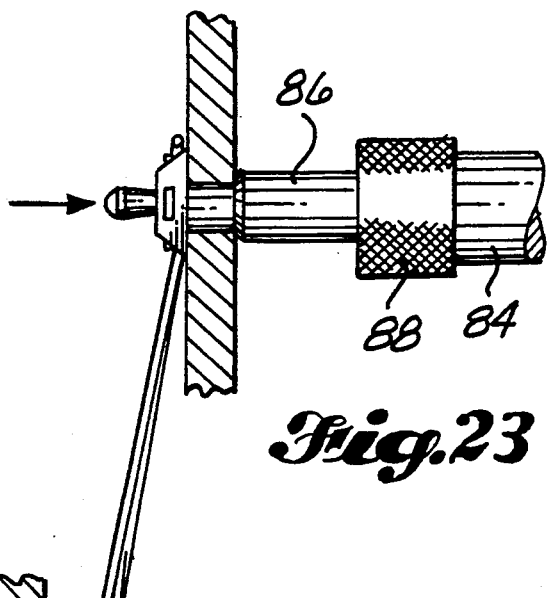
FIG. 23 is a view like FIG. 23, showing the mandrel in the process of being pulled through the tubular body of the tubular retainer.

Referring to FIG. 21, with unit 40 installed, the mandrel puller 84 is moved towards the unit 40, to insert the sleeve carrying mandrel M into and through the central passageway in tubular shank 42. FIG. 16 shows the mandrel M and the sleeve 82 within the tubular shank 42, and shows the unit 40 moved away from member 12 a slight amount. Full extension of the piston within the puller 84 puts sleeve retainer 130 into the position shown in FIG. 16 with flange 134 against radial surface 156. In a manner described in the aforementioned U.S. Pat. No. 4,187,708, hydraulic pressure is moved to pull the mandrel M rearwardly. Initial rearward movement of the mandrel M pulls the tubular shank 42 into the opening 54, and the nut cage base 46 against member 12. Sleeve 82 is in effect clamped onto the small diameter portion 90 of mandrel M. There is a firm frictional engagement between sleeve 82 and the inner surface of tubular shank 22. Thus, when the mandrel is pulled rearwardly, from the position shown in FIG. 16 to the position shown in FIG. 17, the unit 40 is pulled into the opening 54 and the nut cage base 46 is pulled into contact with member 12. End surface 126 contacts the side surface portion of member 12, immediately surrounding opening 54, on the puller tool side of the member 12. Annular lip 124 projects slightly into the opening 54 and its end surface 128 contacts the confronting end surface of tubular shank 42. In other installations, lip 124 may be omitted so that a single surface on the end of nosepiece 86 contacts both the member 12 and the end surface of tubular shank 42. Or, a lip similar to lip 124 may be formed on nosepiece 86 near its outer radial boundary so that it contacts member 12 but is radially outside of the end surface of tubular shank 42. This type of tooling may be used when it is desired for the inner end portion of tubular shank 42 to project slightly beyond the surface of member 12 which confronts the puller 84.

The puller 84 is operated to pull the mandrel M essentially all the way through the sleeve 82, into the nosepiece 86. As described in the aforementioned U.S. Pat. No. 5,103,548, when the increasing and maximum diameter portions 92, 94 of mandrel M enter into the sleeve retainer 130, the fingers 138 bend outwardly so as to enlarge the central passageway in sleeve retainer 130. Passage of mandrel portions 92, 94 through sleeve 82 expands the diameter of sleeve 82 such that its end facing the puller 84 remains in contact with the expanded forward end surface of the sleeve retainer 130.

Thus, as shown in FIGS. 16, 17, 22 and 23, as the mandrel M is retracted, the increasing diameter portion 92 and then the maximum diameter portion 94 of the mandrel M are moved in succession through the split sleeve 82. The forceful movement of the increasing diameter and maximum diameter portions 92, 94, of mandrel M, through the split sleeve 82, causes a radial expansion of the split sleeve 82. When the split sleeve 82 is expanded on the maximum diameter portion 94, the outside diameter of the split sleeve 82 is larger than the initial inside diameter of the tubular shank 42 of unit 40. The radial expansion of split sleeve 82 causes in turn a radial expansion of the tubular shank 42 of unit 40. The expansion that occurs is sufficient to cause a permanent increase in the outside and inside diameters of the tubular shank 42. This radial expansion of the tubular shank 42 does two things. Firstly, it introduces fatigue life enhancing compressive residual stresses in the member 12 immediately around the tubular shank 42. Secondly, it creates a tight interference fit between the tubular shank 42 and the side wall of the opening 54. This tight interference fit secures the tubular shank 42 and the nut cage 44 to the wall 12. As earlier stated, the outer surface of tubular shank 42 may be machined or otherwise treated in order to give it an increase coefficient of friction. For example, when tubular shank 42 is being made a series of grooves may be formed on its outer surface, so as to create outwardly projecting rings between the grooves which have sharp edges that will penetrate into the sidewall of the opening 54 when the tubular shank 42 is being expanded by the mandrel M and split sleeve 82.

For a more complete description of fatigue enhancement by cold expansion, reference is made to the aforementioned U.S. Pat. No. 3,566,662 and the aforementioned paper by Joseph L. Phillips, entitled "Fatigue Improvement Wide Sleeve Cold Working." This patent and the paper are hereby incorporated herein by this reference.

Figure 25:
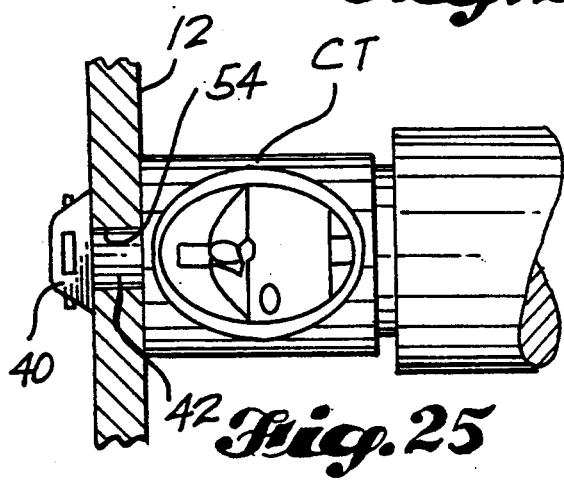
FIG. 25 is a view like FIGS. 21-24, showing a shaving tool being used to shave the end portion of the tubular body flush with the surface of the workpiece.
Figure 26:
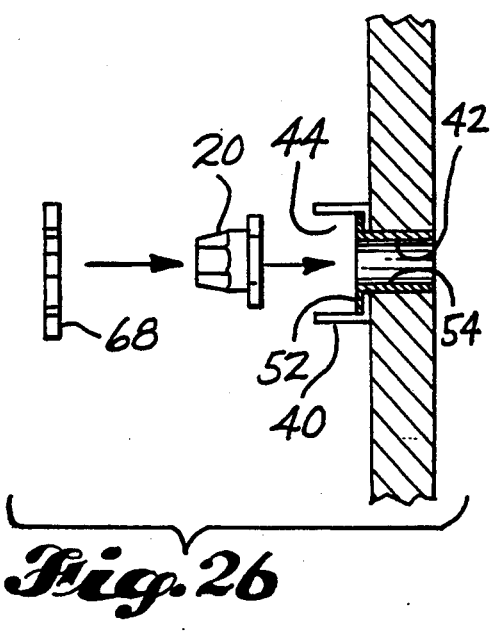
FIG. 26 is a view like FIGS. 20-25, showing a nut being moved into the nut cage and a retainer spring being moved into the nut cage behind it, to secure the nut in the nut cage.

Following a full retraction of the mandrel M, the mandrel puller 84 is moved away from the wall 12. Split sleeve 82 may move away with it or be left inside the tubular shank 42. In the latter event, the split sleeve 82 is separately removed from the tubular shank 42 (FIG. 24). Also, the retainer spring 68 is removed by squeezing the end portions 70, 74 to pull the side portions 64, 66 out from the side openings 60, 62. Then, the side parts 158, 160 of handle H are squeezed together, to move their end portions away from cage walls 48, 50. Then, handle H is removed. Next, a nut 20 (FIG. 8) is set down into the nut cage 44, with its base 24 on the base 46, and with its recesses 26, 28 positioned to receive the lugs 56, 58. Then, the retainer spring 68 is reinstalled to trap the nut 20 within the nut cage 44. Nut base 24 is narrower than cage base 46, between the sides 48, 50. This permits a sideways "float" of the nut 20 within the nut cage 44. The end surfaces of the nut 20 in the regions of the recesses 26, 28 are spaced apart a distance shorter than the spacing between lugs 56, 58. This permits a longitudinal "float" of the nut 20 within the cage 44. Sides 48, 50 restrain movement of the nut 20 in the sideways direction. Lugs 56, 58 restrain movement of the nut 20 in the direction longitudinally of the nut cage 44. Retainer spring 68 permits nut 20 from moving away from base 46 and out from nut cage 44. A cutter tool CT is shown in FIG. 25 being used to trim a projecting end portion 42' (FIG. 24) of the tubular shank 42.

Referring to FIG. 2, when the nut cage unit 40 is installed, the members 10, 12 are brought together and the bolt 14 is inserted first through opening 170 in member 10 and then through the passageway in tubular shank 42. Bolt 14 is moved to place its threads 16 into threaded portion 38. Then, the bolt 14 is rotated to screw threads 16 into the threaded portion 38. The "float" of the nut 20 provides proper alignment of the threads 16 with the threaded portion 68. Bolt 14 is rotated until the two members 10, 12 are pulled together. In the illustrated example, the bolts 14 are shown to have countersunk heads 174 which are received within countersinks 176 (FIG. 2) formed at the entry end of bolt opening 170 in member 10. Heads 174 are shown to include a screwdriver slot 178. In use, the cover 10 needs to be removed frequently from the structure 180 of which flange 12 is a part. If, after some use, a nut 20 should be damaged, the retainer spring 68 can be removed from the nut cage 44, the damaged nut removed, a replacement nut installed, and the retainer spring 68 then reinstalled so as to hold the new nut 20 within the nut cage 44.

FIGS. 9 and 10 show a second embodiment of nut cage unit 182. In this embodiment, the nut cage 184 may be formed integral with the tubular shank 186, as illustrated. Or, the tubular shank 186 may be provided with a flange like flange 52, and inserted through a central opening in the base 188, as in the first embodiment. Nut cage 184, in addition to base 188, includes sides 190, 192. Sides 190, 192 include lug receiving openings 194, 196, 198, 200. These lug receiving openings are in the illustrated embodiment positioned immediately above base 88. Lugs 194, 196 are spaced apart from each other longitudinally of side 190. In similar fashion, openings 198, 200 are spaced longitudinally from each other along side 192. Opening 194 is positioned opposite opening 198. Opening 196 is positioned opposite opening 200.

In an embodiment in which the tubular shank is separate from the nut cage, a flange at the end of the tubular shank will sit down on the base 188. It will be necessary then to raise the openings 194, 196, 198, 200 with respect to the base 188, so that they are immediately above the upper surface of the flange that is at the end of the tubular shank.

Sides 190, 192 are longitudinally straight but are curved in the direction perpendicular to base 188. The inner surfaces of walls 190, 192 have a convex curvature. The nut 20' used in this embodiment has four lugs, two of which are disclosed in FIG. 9. Lug 202 fits within opening 194. Lug 204 fits within opening 196. Along the other side of nut 20', there are two lugs 206, 208. These lugs 206, 208 are identical to lugs 202, 204. As shown in FIG. 10, the nut 20' is positioned with lugs 202, 204 within openings 194, 196. The outer ends of lugs 206, 208 are placed against the convex inner surface of side 192. Then, the nut 20' is pushed upon in the direction of arrow 210. This causes lugs 206, 208 to spring wall 192 outwardly, and snap down into the openings 198, 200. The lugs 202, 204, 206, 208 are narrower than the openings 194, 196, 198, 200. This permits longitudinal float of the nut 20' within the nut cage 184. Also, nut base 212 has a width in its region between the lugs that is narrower than the distance between walls 190, 192. This permits a sideways "float" of the nut 20' within the nut cage 184. The nut cage unit 182 is installed in the manner described above in connection with the first embodiment. That is, the tubular shank 186 is inserted into the opening 54. A handle H may be used with the end portions 164, 166 being located in an imposed pair of openings 194, 198 or 196, 200. The sleeve carrying mandrel M is inserted through the passageway in the tubular shank 86 from the side of member 12 opposite the nut cage 184. The mandrel is pulled through the sleeve and the tubular shank 186, in the manner described, to radially expand both the sleeve 82 and the tubular shank 186, to cold expand the material surrounding the opening 54 and cause an interference fit of tubular shank 186 within the opening 54. Following this procedure, the nut 20' is installed, in the manner described. Nut 20' includes a tubular part 214 that is internally threaded at 216. Base 212 at the inner end of part 214 is opened, to receive a bolt, such as shown in FIG. 2. The lateral and longitudinal float of nut 20' permits alignment of thread 16 on bolt 14 with the threads 216 in nut part 214.

A third embodiment may be like the embodiment of FIGS. 9 and 10 but with a single central opening in each sidewall 190, 192 and a single central lug on the nut base. One lug is produced in one sidewall opening and the other lug against the second sidewall. Then the nut is pushed upon to snap fit the second lug into the second opening.

FIGS. 27–32 show a fourth embodiment of nut cage unit 218 (FIG. 29). This unit 218 includes a tubular shank 220 having a central passageway 222 and a flange 224 at one of its ends. In this embodiment, the tubular shank 220 fits through a central opening 226 in the base 228 of a nut cage 230. Nut cage 230 is formed from a flat piece of metal that is cut to form sides 232, 234 and end portions 236, 238 on the base 228. Lateral cuts 240, 242, extending part way across the base 228, separates the end portions 236, 238 from the main or central portion of the base 228. The portion of the flat metal which becomes walls 232, 234 is turned upwardly, as shown in FIGS. 27–29. This forms the sides 232, 234. Sides 232, 234 initially extend perpendicular to the base 228. Next, the tubular shank 230 is inserted into the central opening 226, and the flange 224 is moved downwardly until shoulder 244 is on base 228. Then, an anvil 246 (FIG. 28), in the form of a long flat bar, is laid down on the flange 224, between sides 232, 234. Next, the sides 232, 234 are bent inwardly into a position on the mandrel 246. In this position the bent portions 232', 234' of sides 232, 234 extend in coplanar parallelism with each other and also parallel to base 228. Following this bending, the anvil 246 is removed (FIG. 31). This procedure forms nut base receiving channels 233, 235 at the sides of the unit. End portions 236, 238 are bent upwardly (FIG. 32) to form end stops for the nut base 248. The nut cage unit 230, 200, 220 is installed by use of the mandrel puller, mandrel and split sleeve, in the manner that has been described. The assembled tubular member 220 and nut cage 230 (FIG. 31) are installed in an opening 54 in a member 12. That is, tubular portion 220 is inserted through the opening 54 and moved endwise to place the base 228 against a side of the member 12. Then, a sleeve carrying mandrel M is inserted into tubular shank 220, from the end thereof opposite the nut cage 230. The tooling is properly placed and then the mandrel is pulled upon to move it through the sleeve and tubular shank 220. As previously described, this both coldworks the material surrounding the opening 54 and creates an interference fit between tubular shank 220 and the sidewall of opening 54. One or both of end portions 236, 238 may be turned up before installation. Or, only member 236 may be turned up before installation. In any event, following installation, the flange 248 of a nut 20" is slid endwise into the channels 233, 235. If end portion 238 was previously turned up, it is necessary to push it down into a flat position before inserting the nut flange 246 into the channels 233, 235. After the nut base 248 is inside the channels 233, 235, the end portion 238 is turned upwardly, so that its end portion is in the path of the confronting end of nut base 248. At the opposite end, the end portion 236 is turned up until its end is in the path of the opposite end of nut base 248. The spacing between the end portions 236, 238 is larger than the length of the nut base 248. Also, the sideways mentioned between sides 232, 234 is wider than the nut base 248. This allows efficient "float" of the nut within the nut cage 230, so that proper alignment of the threads in the nut 20' can be made with the threads 16 and the bolt 14. The bent over portions 232', 234' overhang the opposite side portions of nut base 248 and prevent movement of the nut 20' out from the nut cage 230. As in the earlier embodiments, the outer surface of tubular shank 220 may be machined or otherwise treated to make it rough so that in response to its expansion, it will more securely grip the sidewall of the opening 54.

The preferred embodiment which has been illustrated and described, and the various alternative embodiments which have been either illustrated and described, or merely described, are presented to provide a better understanding of the invention, but are not to by themselves limit the scope of protection. The scope of protection is to be determined by the claims which follow, interpreted in accordance with established rules of patent claim interpretation, including use of the doctrine of equivalents.

What is claimed is:

1. A nut mount unit adapted to be firmly connected to a structural wall by use of a single circular opening in the wall, comprising:

a tubular shank having an outside diameter sized for close fit insertion into the circular opening, and a center passageway having substantially uniform inside diameter;

a flange integral with the tubular shank at one end of the tubular shank, said flange being larger than the circular opening in the wall, and a radial shoulder on the flange formed where the tubular shank joins the flange;

a nut having a nut base and an internally threaded body extending upwardly from said nut base;

a nut cage adapted to receive said nut following securement of the unit to the wall, said nut cage including a nut cage base having a base opening;

said tubular shank being extendable through said base opening and said shoulder on said flange being positionable against the nut cage base;

said tubular shank being expandable radially by axial movement of expansion tooling through said center passageway, and being constructed from a material that in response to radial expansion on it will become permanently larger in diameter, and will make a tight interference fit within the wall opening to in that manner secure the unit to the wall;

wherein the interior of the tubular shank is sized such that following expansion the tubular shank will freely pass a bolt sized to make threaded engagement with said nut following securement of the unit to the wall;

wherein said nut cage also includes a pair of opposite sidewalls which project from the nut cage base in a direction opposite from the tubular shank, said sidewalls defining a space for receiving said nut; and means for securing said nut within the nut cage, and permitting a limited amount of movement of said nut while it is in the nut cage, and permitting removal of said nut from the nut cage.

2. A nut mounting unit adapted to be firmly connected to a structural wall by use of a single circular opening in the wall, comprising:

a tubular shank having an outside diameter sized for close fit insertion into the circular opening, and a center passageway having substantially uniform inside diameter;

a flange integral with the tubular shank at one end of the tubular shank, said flange being larger than the circular opening in the wall, and a radial shoulder on the flange formed where the tubular shank joins the flange;

a nut having a nut base and an internally threaded body extending upwardly from said nut base;

a nut cage adapted to receive said nut following securement of the unit to the wall, said nut cage including a nut cage base having a base opening;

said tubular shank being extendable through said base opening and said shoulder on said flange being positionable against the nut cage base;

said tubular shank being expandable radially by axial movement of expansion tooling through said center passageway, and being constructed from a material that in response to radial expansion on it will become permanently larger in diameter, and will make a tight interference fit within the wall opening to in that manner secure the unit to the wall;

wherein the interior of the tubular shank is sized such that following expansion the tubular shank will freely pass a bolt sized to make threaded engagement with said nut following securement of the unit to the wall;

wherein said nut cage also includes a pair of opposite sidewalls which project from the nut cage base in a direction opposite from the tubular shank, said sidewalls defining a space for receiving said nut;

means for securing said nut within the nut cage, and permitting a limited amount of movement of said nut while it is in the nut cage, and permitting removal of said nut from the nut cage; and wherein the opposite sidewalls of the nut cage include opposed openings, and the nut cage base includes a pair of spaced apart end stops, said end stops and said sidewalls together forming a space in which the nut base is received, and said means for securing a nut comprising a removable retainer spring that fits over the nut base and includes side portions which project into the side openings in the sidewalls.

3. A nut mounting unit adapted to be firmly connected to a structural wall by use of a single circular opening in the wall, comprising:

a tubular shank having an outside diameter sized for close fit insertion into the circular opening, and a center passageway having substantially uniform inside diameter;

a flange integral with the tubular shank at one end of the tubular shank, said flange being larger than the circular opening in the wall, and a radial shoulder on the flange formed where the tubular shank joins the flange;

a nut having a nut base and an internally threaded body extending upwardly from said nut base;

a nut cage adapted to receive said nut following securement of the unit to the wall, said nut cage including a nut cage base having a base opening;

said tubular shank being extendable through said base opening and said shoulder on said flange being positionable against the nut cage base;

said tubular shank being expandable radially by axial movement of expansion tooling through said center passageway, and being constructed from a material that in response to radial expansion on it will become permanently larger in diameter, and will make a tight interference fit within the wall opening to in that manner secure the unit to the wall;

wherein the interior of the tubular shank is sized such that following expansion the tubular shank will freely pass a bolt sized to make threaded engagement with said nut following securement of the unit to the wall;

wherein said nut cage also includes a pair of opposite sidewalls which project from the nut cage base in a direction opposite from the tubular shank, said sidewalls defining a space for receiving said nut;

means for securing said nut within the nut cage, and permitting a limited amount of movement of said nut while it is in the nut cage, and permitting removal of said nut from the nut cage; and wherein the nut base includes first and second sides and at least one lug on each said side, and the sidewalls of the nut cage include convex inner surfaces, and said means for securing a nut comprises at least one opening in each sidewall for receiving a nut base lug, and wherein one said lug is inserted into an opening in a first sidewall, the other lug is positioned against the convex surface of the other sidewall, and the nut is pushed towards the nut cage base so that the other lug will slide along the convex surface and snap into the second opening.

4. A nut mounting unit adapted to be firmly connected to a structural wall by use of a single circular opening in the wall, comprising:

a tubular shank having an outside diameter sized for close fit insertion into the circular opening, and a center passageway having substantially uniform inside diameter;

a flange integral with the tubular shank at one end of the tubular shank, said flange being larger than the circular opening in the wall, and a radial shoulder on the flange formed where the tubular shank joins the flange;

a nut having a nut base and an internally threaded body extending upwardly from said nut base;

a nut cage adapted to receive said nut following securement of the unit to the wall, said nut cage including a nut cage base having a base opening;

said tubular shank being extendable through said base opening and said shoulder on said flange being positionable against the nut cage base;

said tubular shank being expandable radially by axial movement of expansion tooling through said center passageway, and being constructed from a material that in response to radial expansion on it will become permanently larger in diameter, and will make a tight interference fit within the wall opening to in that manner secure the unit to the wall;

wherein the interior of the tubular shank is sized such that following expansion the tubular shank will freely pass a bolt sized to make threaded engagement with said nut following securement of the unit to the wall;

wherein said nut cage also includes a pair of opposite sidewalls which project from the nut cage base in a direction opposite from the tubular shank, said sidewalls defining a space for receiving said nut;

means for securing said nut within the nut cage, and permitting a limited amount of movement of said nut while it is in the nut cage, and permitting removal of said nut from the nut cage; and wherein the opposite sidewalls of the nut cage include edge portions which are turned inwardly and overhang the flange on the tubular shank, and form side channels into which side edge portions of the nut base are received, by sliding the nut endwise into said channels, and wherein said means for securing includes a bent up member at each end of the nut cage, in a position to prevent sliding movement of the nut out from the nut cage.

5. In combination:

a wall including a circular opening extending through the wall;

a nut mount including a tubular shank within said circular opening, said tubular shank being radially expanded in the opening to in that manner firmly secure the grommet to the wall;

said wall being cold expanded about said circular opening;

a nut cage at one end of the tubular shank, said nut cage including a generally rectangular base that is larger than the circular opening in the wall, and a radial shoulder on said base which extends perpendicular to the tubular shank, said shoulder being against the wall, and a pair of opposite sidewalls;

a nut positioned in and retained by the nut cage; between said sidewalls, said nut including a generally rectangular base and a body extending from the base, and threaded bolt receiving opening in said body that is coaxial with the interior of the tubular shank, said nut base being received within the nut cage between the sidewalls; and means removably securing the nut in the nut cage.

6. The combination of claim 5, wherein the nut base includes first and second sides and at least one lug on each said side, and the sidewalls of the nut cage include convex inner surfaces, and said means removably securing comprises at least one opening in each sidewall for receiving a nut base lug, and wherein when said lug is inserted into an opening in a first sidewall, the other lug is positioned against the convex surface of the other sidewall, and the nut is pushed towards the nut cage base so that the other lug will slide along the convex surface and snap into the second opening.

7. In combination:

a wall including a circular opening extending through the wall;

a nut mount including a tubular shank within said circular opening, said tubular shank being radially expanded in the opening to in that manner firmly secure the grommet to the wall;

said wall being cold expanded about said circular opening;

a nut cage at one end of the tubular shank, said nut cage including a generally rectangular base that is larger than the circular opening in the wall, and a radial shoulder on said base which extends perpendicular to the tubular shank, said shoulder being against the wall, and a pair of opposite sidewalls;

a nut positioned in and retained by the nut cage; between said sidewalls, said nut including a generally rectangular base and a body extending from the base, and threaded bolt receiving opening in said body that is coaxial with the interior of the tubular shank, said nut base being received within the nut cage between the sidewalls;

means removably securing the nut in the nut cage; and wherein the opposite sidewalls of the nut cage include opposed openings, and the nut cage base includes a pair of spaced apart end stops, said end stops and said sidewalls together forming a space in which the nut base is received, and said means removably securing comprises a removable container spring that fits over the nut base and includes side portions which project into the side openings of the sidewalls.

8. In combination:

a wall including a circular opening extending through the wall;

a nut mount including a tubular shank within said circular opening, said tubular shank being radially expanded in the opening to in that manner firmly secure the grommet to the wall;

said wall being cold expanded about said circular opening;

a nut cage at one end of the tubular shank, said nut cage including a generally rectangular base that is larger than the circular opening in the wall, and a radial shoulder on said base which extends perpendicular to the tubular shank, said shoulder being against the wall, and a pair of opposite sidewalls;

a nut positioned in and retained by the nut cage; between said sidewalls, said nut including a generally rectangular base and a body extending from the base, and threaded bolt receiving opening in said body that is coaxial with the interior of the tubular shank, said nut base being received within the nut cage between the sidewalls;

means removably securing the nut in the nut cage; and wherein the opposite sidewalls of the nut cage include edge portions which are turned inwardly and overhang the flange on the tubular shank, and form side channels into which side edge portions of the nut base are received, by sliding the nut endwise into said channels, and wherein said means removably securing includes a bent up member at each end of the nut cage, in a position to prevent sliding movement of the nut out from the nut cage, with at least one said member being movable downwardly to permit the nut to be slid endwise out from the nut cage.

* * * * *